United States Patent [19]
Beisch

[11] 3,757,400
[45] Sept. 11, 1973

[54] METHOD OF MANUFACTURE OF VEHICLE WHEEL TRIM

[75] Inventor: Hans R. Beisch, Essex County, Canada

[73] Assignee: Sargent Industries of Michigan, Inc., Ypsilanti, Mich.

[22] Filed: May 24, 1971

[21] Appl. No.: 146,082

[52] U.S. Cl. ............ 29/159 A, 301/37 B, 301/37 R, 301/37 T
[51] Int. Cl. ....... B21d 53/26, B21k 1/28, B21k 1/42
[58] Field of Search ....................... 29/159 R, 159 A, 29/425; 113/116 R; 301/37 B, 37 R, 37 T, 37 C, 37 TP

[56] References Cited
UNITED STATES PATENTS

| 2,674,787 | 4/1954 | Lyon | 29/159 A |
|---|---|---|---|
| 2,754,943 | 7/1956 | Lyon | 301/37 R X |
| 2,772,924 | 12/1956 | Landell | 301/37 B |
| 2,785,777 | 3/1957 | Horn | 301/37 B X |
| 3,006,691 | 10/1961 | Lyon | 29/159 A X |
| 3,317,249 | 5/1967 | Dagobert | 301/37 B |

Primary Examiner—Charles W. Lanham
Assistant Examiner—V. A. DiPalma
Attorney—Harness, Dickey and Pierce

[57] ABSTRACT

This disclosure pertains to a novel method of manufacturing trim rings generally comprising the steps of providing a plurality of circular blanks, forming the outer portion of each said blank into an approximate trim ring configuration, forming wheel retention means on the inner portion of each said blank, forming each said inner portion into a shape complementary to the configuration of each said outer portion, and securing each said inner portion to one of said outer portions. Also disclosed is a novel trim ring structure incorporating improved locating and retention means.

19 Claims, 19 Drawing Figures

PATENTED SEP 11 1973
3,757,400
SHEET 1 OF 3
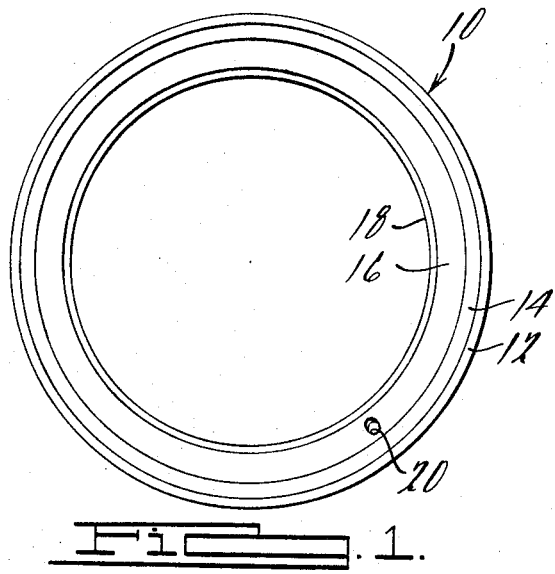
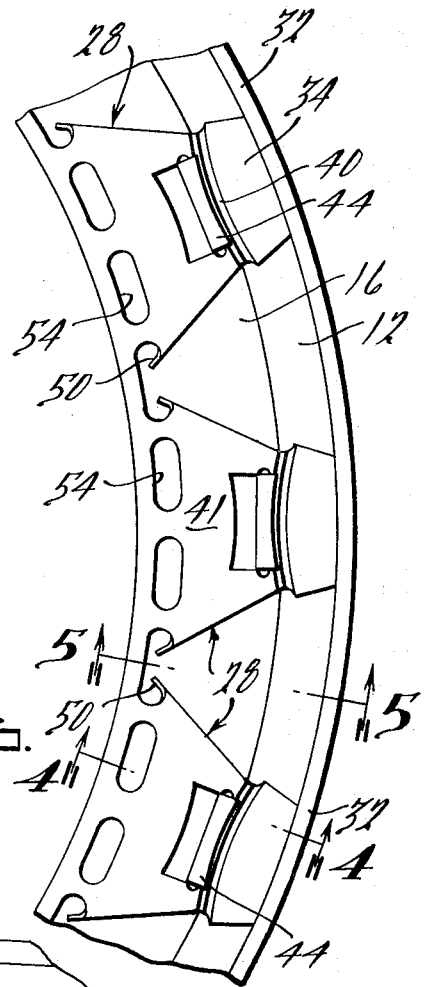
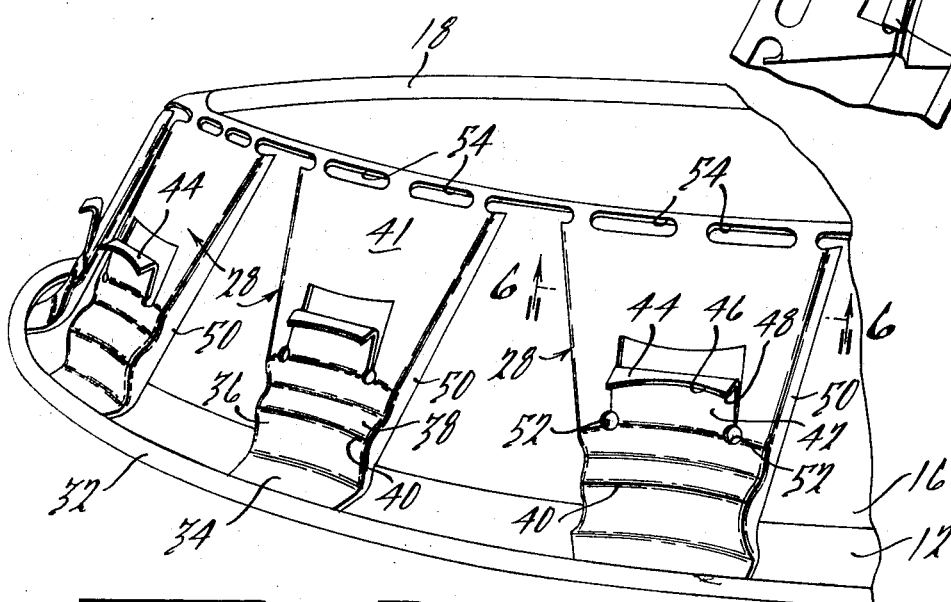
INVENTOR.
Harris R. Beisch.
BY
Harness, Dickey & Pierce
ATTORNEYS.

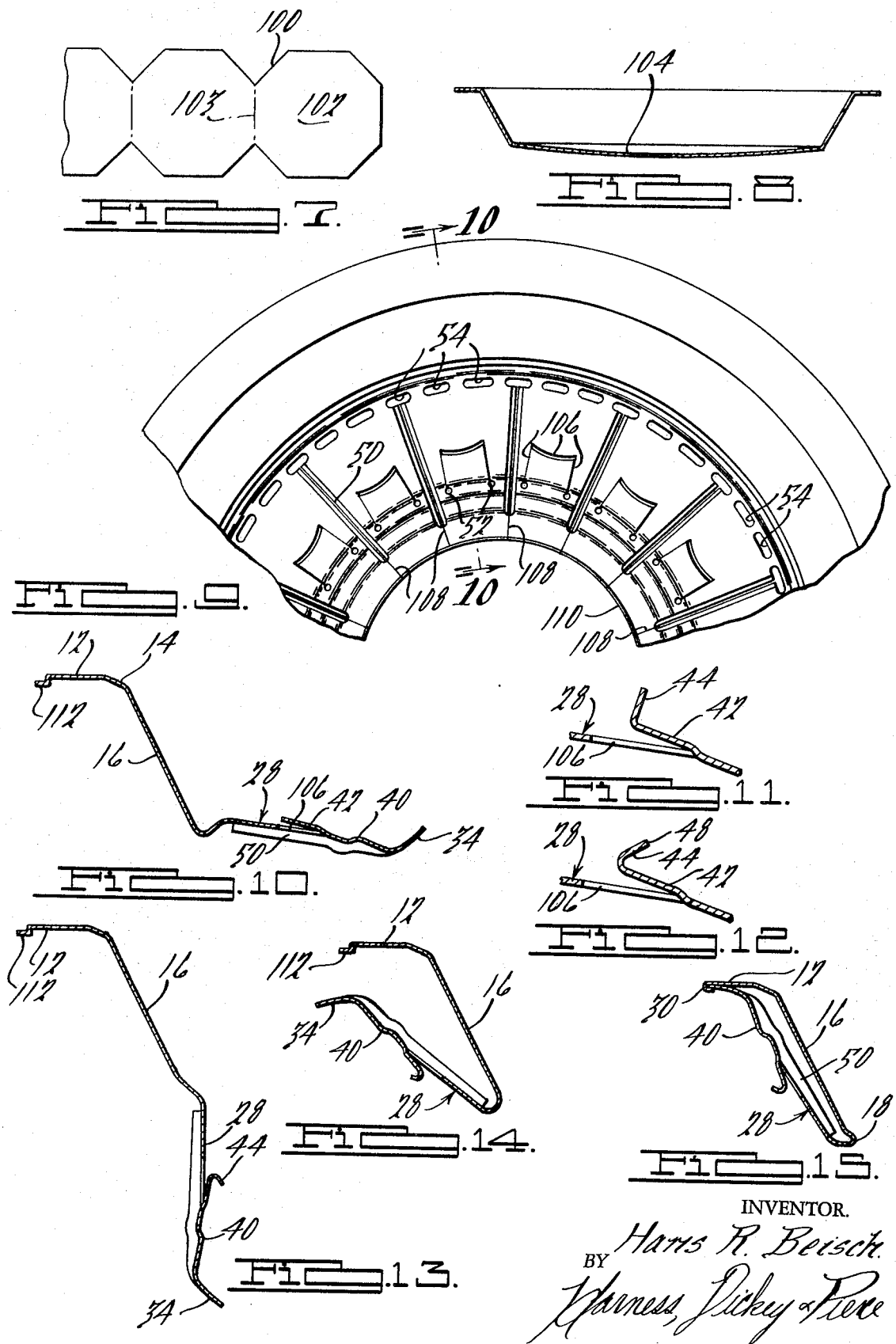

METHOD OF MANUFACTURE OF VEHICLE WHEEL TRIM

BACKGROUND AND SUMMARY OF THE INVENTION

Generally speaking, the function of automotive wheel trim is to decorate and/or protect the automotive wheel, and one of the major problems in the design of a commercially successful article of wheel trim concerns the provision of means for satisfactorily locating and retaining the trim on the wheel. Also, it must be capable of mass production at a minimum cost.

Insofar as trim rings are concerned, one common technique of manufacture is to roll a narrow strip of material into the desired cross-sectional shape, form cut lengths into hoops, and then weld the ends of the hoops together. The resultant article may constitute the ornamental portion of the trim ring, a retention band, or both. Another technique is to stamp them from polygonal or square blanks cut from a relatively wide strip of material. One disadvantage of the rolling process is the difficulty in forming a presentable seam, if it is the ornamental part which is rolled, without inordinately increasing the cost of manufacture. Another is that if it is not the ornamental part which is rolled you have a relatively expensive multi-piece trim ring. One disadvantage of the conventional stamping method is that the relatively large center of the blank must be scrapped. Also such trim rings are usually made in several pieces. Trim rings which are made entirely in one piece, with the retention consisting of a plurality of fingers extending radially and axially outwardly from the inner periphery thereof, are shown in U.S. Pat. Nos. 2,732,260 and 3,083,060; however, those types suffer the significant disadvantage that because of the extreme relative length of the retention fingers it is almost impossible to achieve or maintain the stiffness necessary to have reliable retention, particularly in the case of massed produced parts. The situation is further aggravated in the case of a full trim ring which extends to the outer periphery of the wheel.

It is therefore a primary object of the present invention to provide an improved automotive wheel trim device having good retention characteristics, and particularly a full trim ring, which is formed in one piece from a single blank with attendant reduced scrap loss and material cost and which is suitable for fabrication by mass production techniques, thus avoiding the aforementioned disadvantages of known trim rings. An important related object of the present invention resides in the provision of an improved method of manufacture thereof.

Another object of the present invention resides in the provision of an improved automotive wheel trim device particularly suited for use as a trim ring and incorporating an improved retention system in which there is provided a relatively rigid base structure from which relatively short and hence stiff retention fingers may be formed, which retention system is not sensitive to the normal tolerance variations encountered in mass production.

Another object concerns the provision of an improved economical method of fabrication of a trim ring. A related object concerns the provision of such a method in which material costs and scrap are reduced by utilization of the normally-scrapped center portion of the blank, by utilization of no materials other than the original blank and by deferring surface finishing operations until the final operation so that highly sensitive finished surfaces are not subjected to normal fabricating operations and hence a high risk of damage.

Another object of the present invention resides in the provision of an improved trim ring which is of one-piece construction, which has no seam showing on the ornamental face thereof, and which may be fabricated by conventional stamping or pressing operations.

A further object resides in the provision of an improved trim ring having design flexibility in the type of retention means which may be used.

These and other objects, features and advantages of the present invention will become apparent from the subsequent description and the appended claims, taken in conjunction with the accompanying drawings.

BRIEF DESCRIPTION OF THE DRAWINGS

FIG. 1 is a plan view in the axial direction of the ornamental outer face of a trim ring embodying the principles of the present invention;

FIG. 2 is a perspective view of a portion of the inner face thereof;

FIG. 3 is a plan view in the axial direction of a portion of the inner face thereof;

FIG. 7 is a plan view of the original strip of raw material from which the present trim ring is fabricated in accordance with the present invention;

FIG. 8 is a cross-sectional view of the blank shown in FIG. 7 after certain steps in the method of fabrication have been performed;

FIG. 9 is a plan view in the axial direction of a portion of the blank after certain further steps in the method of fabrication have been performed;

FIG. 10 is a fragmentary cross-sectional view taken along the line 10—10 in FIG. 9;

FIGS. 11 and 12 are fragmentary cross-sectional views showing formation of the retention tooth of the present invention;

FIGS. 13, 14 and 15 are fragmentary cross-sectional views illustrating further steps in the method of fabrication of the present trim ring;

DETAILED DESCRIPTION OF THE PREFERRED EMBODIMENT

Figure 4:
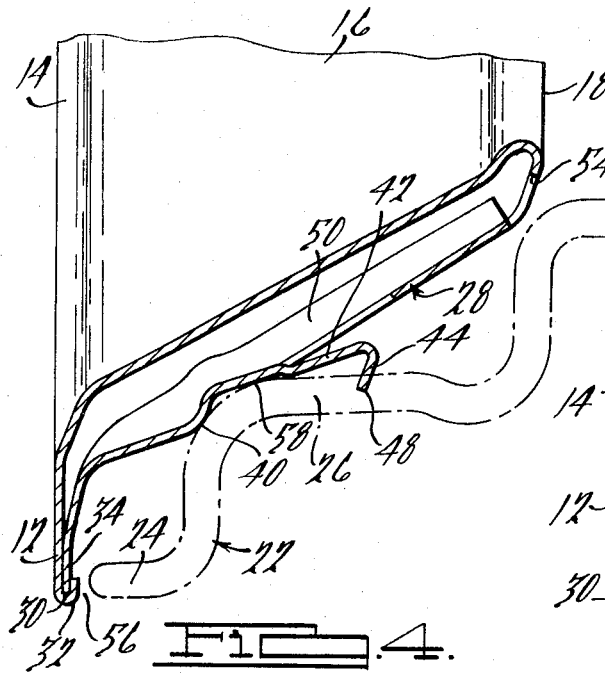
FIG. 4 is a cross-sectional view taken along line 4—4 of FIG. 3, also illustrating in phantom cross-section a portion of a conventional automotive vehicle wheel.
Figure 5:
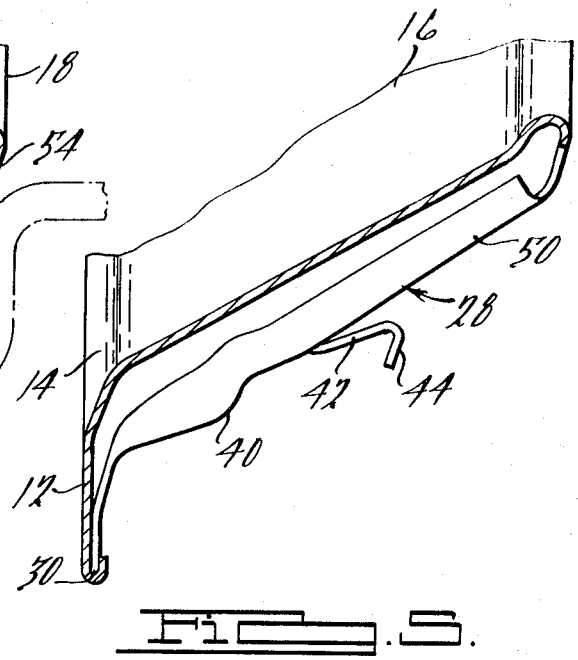
FIG. 5 is a cross-sectional view taken along line 5—5 in FIG. 3.
Figure 6:
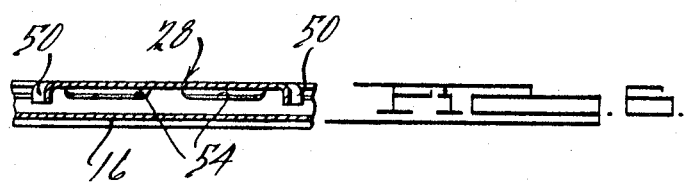
FIG. 6 is a cross-sectional view taken along line 6—6 in FIG. 2.

The structure and method of fabrication of the present invention is applicable to automotive wheel trim generally, however because of the utilization of the center portion of the raw material blank for reinforcing and retaining elements they are particularly suited to the manufacture of trim rings, and the present invention is therefore described as embodied in a trim ring and method of manufacture thereof. The principles of the present invention, however, may be readily applied to a wheel cover, i.e., a device also covering the entire center portion of an automotive wheel, by the addition of a suitable ornamental and/or protective element, medallion or the like to the open center portion of the trim ring, using techniques well known to those skilled in the art.

Referring more particularly to the drawings, there is illustrated in FIG. 1 a trim ring 10 for an automotive wheel. Trim ring 10 consists generally of an outer peripheral flange 12 adapted to overlie the outer peripheral rim of an automobile wheel, an intermediate portion 14, a major central portion 16 and an inner peripheral edge 18. Trim ring 10 is generally conical in overall configuration, however the entire configuration of the outer face of the trim ring shown is purely exemplary and may be varied for any particular application. A valve stem hole 20 is provided through central portion 16.

As can be seen in FIG. 4, when the trim ring of the present invention is affixed to a conventional automotive vehicle wheel, such as indicated at 22, outer peripheral flange 12 axially overlies the outer rim 24 of the wheel, and central portion 16 overlies the intermediate flange 26 of the wheel, being primarily radially inwardly and slightly axially outwardly disposed with respect thereto. Wheel 22 is of conventional construction and as partially shown in FIG. 4 its center axis or axis of rotation (not shown) extends horizontally across the drawing in the plane thereof above the figure shown.

Disposed about the axially inner and radially outer side of central portion 16 are a plurality of reinforcing elements 28, the inner ends of which are integral with inner peripheral edge 18 and the outwardly facing surface of the trim ring; i.e. the entire trim ring is formed of a single integral piece of material, preferably stainless steel or a similar material capable of receiving a suitable decorative and protective finish. The outer ends of reinforcing elements 28, indicated at 30, are rigidly secured to outer peripheral flange 12 preferably by crimping the outer peripheral edge of flange 12 over end 30 of element 28, such as indicated at 32.

Each reinforcing element 28 comprises an outer flange portion 34 generally parallel to flange 12, a generally axially extending portion 36, a generally radially extending portion 38 and a main body portion 41. As best seen in FIGS. 2 and 3, the junction of each portion 38 and its adjoining portion 36 consists of an arcuate ridge 40. Projecting from main body portion 41 of each element 28 is wheel retention means comprising a finger portion 42 extending generally axially inwardly from portion 41 and having at the free end thereof a reversely bent tooth 44 extending in a direction which is primarily radially outwardly but having a slight axially outward component. The free edge 46 of tooth 44 is arcuate whereby two wheel engaging points 48 are formed at opposite ends thereof. The side edges of elements 28 are provided with radial flanges 50 to increase the stiffness thereof. Additional dimples or ridges may be provided if further stiffness is desired. In order to relieve stresses and reduce the possibility of fracture, stress relieving holes 52 are provided at the juncture of each edge of each finger 42 and its element 28. The inner ends of reinforcing elements 28 are provided with a plurality of elongated openings 54 to relieve stresses at that point, and also to facilitate fabrication of the trim ring without fracture or the creation of an irregular peripheral surface.

As best seen in FIG. 4, the trim ring is retained on the wheel by virtue of the biting engagement of points 48 into intermediate flange 26 of the wheel. In FIG. 4 finger 42 and tooth 44 are shown in an unstressed condition and the wheel is shown in phantom. As can be seen from the illustrated relationship of the parts, when the trim ring is fixed axially on its wheel, fingers 42 will be resiliently deflected inwardly and the stress thus created in all of the fingers will serve to urge all of the points 48 into biting engagement with the wheel to retain the trim ring thereon. Because of the rake angle of each tooth 44 with respect to its finger 42 outwardly axial movement of the trim ring with respect to the wheel tends to cause points 48 to bite deeper and thereby resist such movement. This prevents accidental disengagement from the trim ring from the wheel. On the other hand, fingers 42 are sufficiently flexible that the trim ring may be pried from the wheel by inserting a prying tool between flange 12 and outer rim portion 42 of the wheel.

Because each finger 42 is relatively short in the axial direction, it may easily be made sufficiently stiff to provide reliable retention. This stiffness may of course be varied in designing a trim ring by varying the width and length of the finger. This is in part possible because of the stiffness of element 28 which serves as an anchor. Similarly, tooth 44 is sufficiently short in the radial direction that it is substantially rigid with respect to its finger 42. These features are significant in providing reliable retention which may be economically mass produced on a repeatable basis, i.e., without being adversely subject to variances in normal manufacturing tolerances.

Although teeth 44 are instrumental in retaining the trim ring on the wheel, arcuate ridges 40 and adjacent body portions 41 are primarily responsible for locating the trim ring with respect to the vehicle wheel. As can be seen in FIG. 4, each arcuate ridge 40, or at least the ends thereof, because of its curvature, engage the arcuate portion of the wheel intermediate flange 26 and rim 24, such engagement serving to axially position the trim ring with respect to the wheel in such a way that a small gap 56 of uniform dimension is provided about the wheel periphery between flange 34 and wheel rim 24, in order to facilitate the insertion of a conventional wheel weight clip. The arcuate shape of ridge 40 also serves to further stiffen element 28. The trim ring is radially located with respect to the vehicle wheel by the engagement of each body portion 41, adjacent ridge 40, with intermediate flange 26 of the wheel, as indicated at 58. The inherent strength of the trim ring resulting from the cross-sectional configuration thereof, i.e., the provision of a reinforcing element rigidly secured at both ends to the outwardly facing portion of the trim ring to form a continuous hollow section, provides a strong support structure for the axial locating means, radial locating means, and retention means of the trim ring of the present invention. It has been discovered that sixteen elements 28, each with retention means, have given very satisfactory results in a trim ring for a 15 inch wheel, however this number is not believed critical and variations therefrom are believed to yield satisfactory results.

Figure 16:
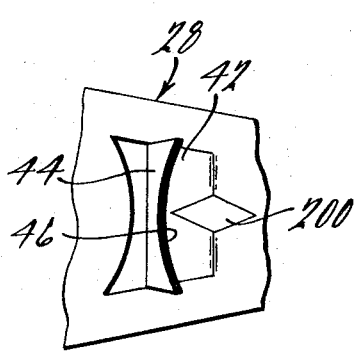
FIG. 16 is a fragmentary plan view of a modification of the retention means of the present invention.

Several modifications of the structure which may be desired in a particular application are those shown in FIGS. 16 through 19. If it is found in a particular application that a more rigid retention is desired, a dart 200 such as shown in FIG. 16 may be provided. If a given application requires additional fastening strength at the juncture of free end 30 of element 28 and flange 12, such free end may be flanged as shown at 202 in FIG. 17 prior to the application of crimp 32. Because end edge 30 is circular convex, for reasons which will become apparent below, the opposite edges thereof will tend to bite into the crimped portion and a greater mechanical interlock will result. Even if edge 30 is not flanged as at 202 there will be some mechanical interlock as a result of the convex curvature thereof if formed in the manner set forth below.

Figure 18:
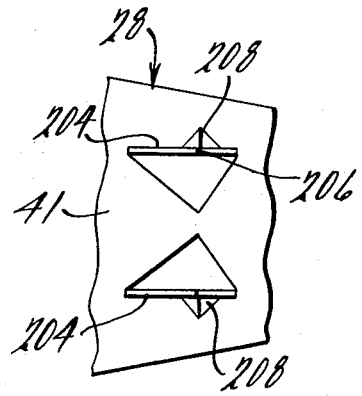
FIG. 18 is a fragmentary plan view of a modified retention means.
Figure 17:
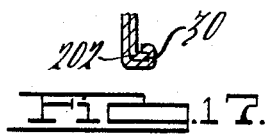
FIG. 17 is a fragmentary cross-sectional view of a modified technique of fabricating the trim ring of the present invention.
Figure 19:
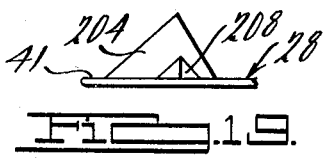
FIG. 19 is a side view of the retention means shown in FIG. 18.

An alternative retention is illustrated in FIG. 18. In this embodiment a pair of teeth 204 of triangular configuration are lanced and bent out of portion 41 of each element 28, each tooth providing a single biting point of engagement 206 with the vehicle wheel. For additional rigidity or stiffness a dart 208 may also be provided. Other known retention systems may also be utilized with rigid reinforcing element 28 as a base, as will be apparent to those skilled in the art.

One of the particular advantages of the trim ring of the present invention is its suitability to an economical method of manufacture, in significant part due to the fact that the present trim ring may be fabricated from a single blank of raw material no greater in size than the blank from which known trim rings are fabricated, without requiring the addition of further material for the hidden supporting, locating and/or retention structure. This is because such structure in the present trim ring is fabricated from that material present in the center of the blank which in conventional processes is scrap. As a consequence, not only is the scrap rate reduced but the need for additional materials is obviated.

A method of fabrication of the present wheel trim is set forth below, with particular reference to FIGS. 7 through 15. The input raw material is in the form of a strip or coil of stainless steel or other material having similar characteristics and suitable for appropriate finishing. The strip is slightly wider than the developed cross-section of the completed trim ring. The first operation formed is that of notching the strip as at 100 in FIG. 7 to define successive blanks 102 which are separated by a cutting operation from the coil along a line 103 and then drawn into the cross-sectional configuration shown in FIG. 8. As will be noted in FIG. 8, the central area 104 of the workpiece is slightly dished. This is for the purpose of work hardening the metal in this area, in addition to that material which is more severely drawn, to achieve a trim ring having the desired stiffness. The next step, illustrated in FIG. 9, is to restrike and emboss the center cross-sectional configuration shown in FIG. 10 (less flange 50 and finger 42), after which holes 54 and holes 52 are pierced and the outside diameter of the blank is trimmed into a circular configuration. The retention fingers 42 and teeth 44 are then lanced and slightly bent out of the blank along the line 106 as seen in FIGS. 9 and 10, and at the same time the sections which ultimately form reinforcing elements 28 are lanced along lines 108, as seen in FIG. 9. The next step is to flange the outside diameter of the blank to form flange 12, intermediate portion 14, and a small outer flange 112 (FIG. 10) which will ultimately become crimp 32. Radial flanges 50 are also formed, and the inside circumference 110 of the blank is then pierced to the configuration shown in FIG. 9. A restrike of the blank is then made to bend the retaining teeth 90°, as shown in FIG. 11, after which a further restrike reversely bends the teeth to the final position shown in FIG. 12. Thereafter, the center portion of the blank which ultimately forms reinforcing elements 28 is drawn or wiped downwardly to the position shown in FIG. 13, after which elements 28 are reversely bent into the configuration shown in FIG. 14 by means of a double cam operation, one set of cams being inserted between elements 28 and portions 14 in the vicinity of holes 54 to provide a rigid surface or edge about which elements 28 may be uniformly bent without distorting inner periphery 18. The next step is the utilization of a spinning or rolling operation to fold the outside edge of the blank, at flange 112, over the peripheral edge 30 of the end of each elements 28, after pushing free ends of elements 28 against flange 12 by means of the pressure pad on the spinning apparatus, as shown in FIG. 15. Valve stem hole 20 may then be pierced, after which the ornamental portions of the trim ring may be buffed and/or plated, as desired.

One advantage of the present structure and method is that at the time of finishing there is substantial structure to grip in a finishing fixture. Also, it is not necessary to polish and/or plate any surfaces which will not ultimately show. Furthermore, the present process does not require a finishing operation until the product is fully formed, nor does it require the use of finished raw material, thus reducing the likelihood of creating scrap by damaging a finished surface.

Thus, there is disclosed in the above description and in the drawings embodiments of the invention which fully and effectively accomplish the objects thereof. However, it will be apparent that variations in the details of construction and the method may be indulged in without departing from the sphere of the invention herein described, or the scope of the appended claims.

I claim:

1. A method of manufacturing wheel trim for a vehicle wheel, comprising: stamping a generally circular member out of a generally flat blank of sheet material; forming a plurality of generally radially extending slits in said member, each of said slits extending outwardly from adjacent the center of said member to points disposed substantially equal distances from the outer periphery of said member; piercing the center out of said member to render same generally annular in shape, whereby a plurality of radially inwardly extending integral elements having inner free ends are thus defined about the inner periphery of said member; forming projecting wheel-engaging teeth from the material of a portion of each of said elements; forming said elements so that they generally overlie the unslit outer portion of said member; and rigidly connecting the free ends of said elements to the outer periphery of said member.

2. The method of claim 1, wherein the outer periphery of said member is crimped over the free ends of said elements to rigidly connect them together.

3. The method of claim 1, wherein said member is drawn prior to said slitting to form a generally conical side wall and a generally flat center portion.

4. The method of claim 3, wherein each of said slits extends outwardly to adjacent the juncture of said conical side wall and said generally flat center portion.

5. The method of claim 1, further including forming stiffening flanges along the edges of each of said elements.

6. A method of manufacturing trim rings for vehicle wheels, comprising: stamping a plurality of generally circular members out of generally flat sheet material; forming the outer portion of each said member into an approximate trim ring configuration; forming wheel retention means on the inner portion of each said member and forming each said inner portion into a shape complementary to the configuration of each said outer portion; and securing each said inner portion to one of said outer portions.

7. A method as claimed in claim 6, wherein the outer peripheral edge of said formed inner portion is secured to the outer peripheral edge of said outer portion.

8. A method as claimed in claim 6, further comprising the step of removing the center of each said member prior to said forming of said inner portion into said complementary shape.

9. A method as claimed in claim 6, wherein said forming of said inner portion into said complementary shape is performed while the latter is integral with said outer portion.

10. A method as set forth in claim 6, wherein said forming of said retention means is performed while said inner portion is integral with said outer portion.

11. A method of manufacturing wheel trim for a vehicle wheel, including the following steps: providing an annular member with an annular opening at the center of the annular member to define inner and outer peripheries on the member, forming a plurality of radial slits in tne annular member at circumferentially spaced positions around the inner annular periphery of the member where the slits extend only a partial distance from the inner annular periphery to the outer annular periphery of the member, forming a plurality of retention means in the annular member at positions between the successive pairs of slits at radial distances intermediate the lengths of the slits, and forming the slitted portions of the annular member into reinforcing means each supported at its opposite ends by the unslit portion of the annular member.

12. A method as set forth in claim 11 wherein the outer periphery of the annular member is shaped to retain the inner periphery of the slitted portions of the annular member when the slitted portions of the annular member are formed into the reinforcing means.

13. A method as set forth in claim 12 wherein the member is provided, prior to the slitting, with a generally conical side wall and a generally flat center portion and wherein the flat center portion is radially slitted toward the generally conical side wall.

14. A method as set forth in claim 13 wherein the flat center portion is shaped to stiffen this portion at positions near the inner periphery.

15. A method as set forth in claim 14 wherein the slitted portions of the annular member are retained in integral relationship with the unslitted portion of the annular member when the slitted portions of the annular member are formed into the reinforcing means.

16. A method of manufacturing wheel trim for a vehicle wheel, including the following steps: providing an annular member having inner and outer annular peripheries, slitting the annular member radially from the inner periphery to a distance intermediate the inner and outer peripheries at spaced positions around the annular periphery of the member, forming the unslitted portion of the member into a conical configuration with the outer periphery forming the base of the conical configuration, forming teeth in the slitted portions of the annular member at positions intermediate the radial length of the slit and intermediate the distance between adjacent slits, and forming from the slitted portions reinforcing means supported at their opposite radial ends by the unslitted portion of the annular member.

17. A method as set forth in claim 16, including the following step: shaping the slitted portions of the annular member at positions between the inner periphery of the annular member and the teeth to stiffen the slitted portions at these positions.

18. A method as set forth in claim 17, including the step of: forming the outer periphery of the annular member to provide for a retention of the inner periphery of the annular member by the outer periphery of the annular member when the slitted portions are formed into the reinforcing means.

19. A method as set forth in claim 17 wherein the slitted portions of the annular member are integral with the unslitted portion of the annular member when the slitted portions of the annular member are formed into the reinforcing means.

* * * * *